United States Patent [19]
Weisburn et al.

[11] Patent Number: 5,531,399
[45] Date of Patent: Jul. 2, 1996

[54] TAPE REEL

[75] Inventors: James T. Weisburn, Massillon; Bruce C. Straslicka, Medina, both of Ohio

[73] Assignee: Alpha Enterprises, Inc., North Canton, Ohio

[21] Appl. No.: 314,150

[22] Filed: Sep. 28, 1994

[51] Int. Cl.⁶ .................................................. B65H 75/14
[52] U.S. Cl. ............................................................ 242/608.6
[58] Field of Search .................................. 242/600, 607, 242/608, 608.6, 609, 609.1, 610.6, 611.2, 118.4

[56] References Cited

U.S. PATENT DOCUMENTS

| | | | |
|---|---|---|---|
| 3,041,005 | 6/1962 | Wallace | 242/609.1 |
| 3,143,313 | 8/1964 | Purzycki | 242/609 |
| 4,068,808 | 1/1978 | King | 242/118.4 |
| 4,101,095 | 7/1978 | Carter . | |
| 4,226,381 | 10/1980 | Katata . | |
| 4,266,738 | 5/1981 | Nakagawa . | |
| 4,289,282 | 9/1981 | Kohno . | |
| 4,473,194 | 9/1984 | Kashimura . | |
| 4,515,323 | 5/1985 | Rood et al. | 242/609 |
| 4,570,869 | 2/1986 | Tsuji | 242/609 |
| 4,629,136 | 12/1986 | Vallance | 242/608.6 |
| 4,702,429 | 10/1987 | Black . | |
| 4,867,391 | 9/1989 | Resch | 242/609.1 |
| 4,893,764 | 1/1990 | Juntunen . | |
| 5,114,089 | 5/1992 | Posso . | |

FOREIGN PATENT DOCUMENTS

| | | | |
|---|---|---|---|
| 63-180685 | 7/1988 | Japan | 242/608.6 |
| 1-98575 | 4/1989 | Japan | 242/608.6 |

*Primary Examiner*—John P. Darling
*Attorney, Agent, or Firm*—Sand & Sebolt

[57] ABSTRACT

A tape reel comprising identical first and second one-piece members which are snap-fitted together to form the reel. Each of the members includes a circular flange and a semicircular hub section having inner and outer walls and an intervening web wall. A pair of elongated latching slots is formed in each of the web walls. A pair of upstanding latching projections are formed on each of the members and are located diametrically opposite of a respective latching slot. A pair of latching catches are formed on opposite inner and outer sides of each of the latching projections. When the inner catches are engaged in the latching slots of the opposite member, the members are joined whereby the flanges have a first spacing therebetween, and when the outer catches are engaged in the latching slots, the members are joined whereby the flanges have a second spacing therebetween smaller than the first spacing.

21 Claims, 7 Drawing Sheets

TAPE REEL

BACKGROUND OF THE INVENTION

1. Technical Field

The invention relates to a reel construction for winding and storing of a tape thereon. More particularly, the invention relates to such a tape reel which is formed by two identical members which are snap fitted together to form the assembled reel, and in which the spacing between the reel flanges can be varied easily to accommodate various widths of tapes.

2. Background Information

Numerous reel constructions have been developed for storing and transporting various types of tapes, such as movie and video film, as well as tapes which have a plurality of electronic components spaced along the tape for use in storing, shipping and subsequently dispensing such components when assembling electronic equipment. It is desirable to produce these tape storage reels as inexpensively as possible without sacrificing their efficiency, usefulness and durability. It is also desirable that the Width or spacing between the reel flanges be variable whereby the tape reel can accommodate various widths of tapes, depending upon their particular application. Likewise, it is always desirable in manufacturing a product such as a tape reel, that the product be formed of as few component parts as possible to reduce manufacturing costs and inventory.

Many prior art tape reels are molded of plastic material in two or more components which are subsequently joined by various attachment devices. Some examples of known prior art tape reel constructions are shown in U.S. Pat. Nos. 4,101,095, 4,266,738, 4,289,282, 4,473,194, 4,702,429, 4,226,381, 4,893,764 and 5,114,089. Although these various prior art tape reels may perform satisfactorily for their intended purpose, they require at least two different component parts which are assembled, or three or more individual distinct parts, which are subsequently assembled together in forming the final tape reel.

Therefore, the need exists for an improved tape reel which is formed relatively inexpensively of a single injection-molded plastic component or part which, when two of the components are assembled together, preferably in a snap-fit relationship, they form a tape reel which is sturdy and durable in use for its intended purpose.

SUMMARY OF THE INVENTION

Objectives of the invention include providing an improved tape reel which can be mass produced relatively inexpensively of a single injection-molded plastic part which, upon assembly of two of the parts, forms the final tape reel construction by a simple snap-fit engagement of the two parts.

A further objective of the invention is to provide such a tape reel in which the spacing between the reel flanges can be varied relatively easily during the injection-molding process by simple replacement of inserts in the forming mold in the hub section thereof, thereby avoiding expensive molds for forming tape reels of varying widths.

A still further objective of the invention is to provide such a tape reel construction in which the two reel members are snap fitted together and secured in an assembled position, preferably by four locking members, which prevent premature separation of the joined reel members, yet which enables disassembly of the reel members should one of the members become damaged for subsequent repair.

Another objective of the invention is to provide such a tape reel which is of a relatively simple, inexpensive, yet durable and sturdy construction, and which can be mass produced and assembled at a relatively low cost due to the use of only a single component.

These objectives and advantages of the invention are achieved by the improved reel adapted for carrying a tape thereon, said reel including first and second members joinable to form said reel, each of said members comprising a circular flange having inner and outer faces, an arcuate hub section extending from the inner face, said hub section having outer and inner concentric peripheral walls and an intervening web wall, said web wall being formed with a pair of slots; a pair of flexible latching projections extending from the inner face of each of said members and complementary sized to the web wall slots so as to be receivable therein, each of said projections being formed with first and second catches extending outwardly in opposite directions from each other, said latching projections of the first and second members extending into the slots of the second and first end members, respectively, with one of said catches of each of said latching projections of each of said members engaging the web wall of the other of said members to join said members together, with said hub sections circumferentially aligning with each other to form a substantially cylindrical hub spacing the circular flanges a predetermined distance apart for receiving a length of tape therebetween.

BRIEF DESCRIPTION OF THE DRAWINGS

A preferred embodiment, illustrative of the best mode in which applicants have contemplated applying the principle, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
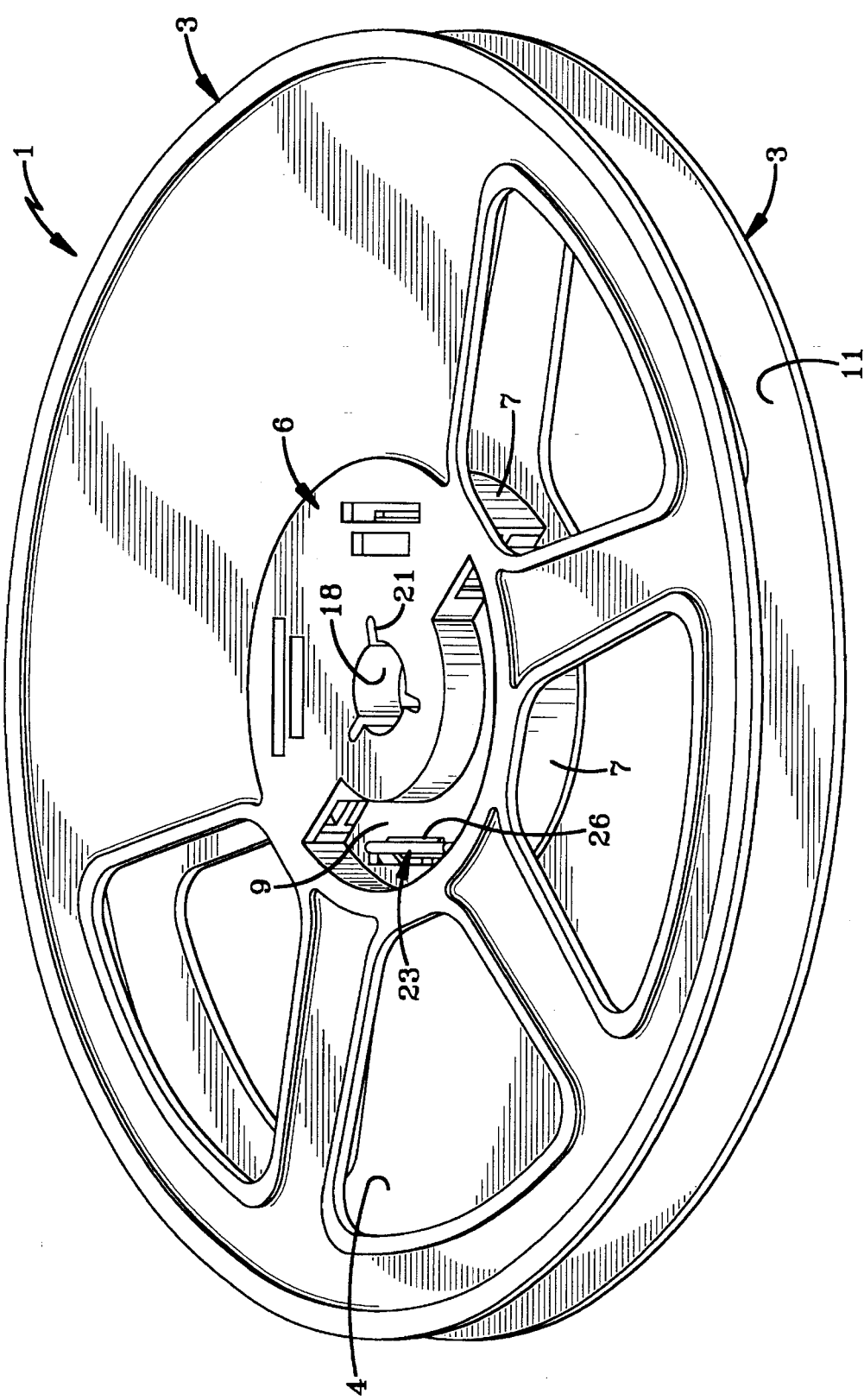
FIG. 1 is a perspective view of the improved tape reel of the present invention in an assembled condition.

The tape reel of the present invention is indicated generally at 1, and is shown in a first assembled position in FIG. 1. Reel 1 includes two identical members, each of which is indicated generally at 2, one of which is shown in detail in FIGS. 2, 3 and 4. Each reel member 2 includes a circular flange, indicated generally at 3, which may be formed with a plurality of openings 4 to reduce the weight of the reel and save material costs. Openings 4 will also enable the tape to be viewed on the reel. Each reel member is molded as a one-piece member of a plastic material in a usual plastic injection-molding process and equipment.

Each reel member 2 further includes a hub section, indicated generally at 6. Hub section 6 includes an outer arcuate, preferably semicircular, upstanding wall 7, and an inner concentric wall 8, with an intervening radially extending web wall 9. In the reel member shown in FIG. 2, web wall 9 is generally intermediate inner surface 11 of circular flange 3 and the arcuate top edges 12 and 13 of hub walls 7 and 8, respectively. Inner hub wall 8 preferably terminates in a pair of radially outwardly extending reinforcing flanges 14.

Figure 4:
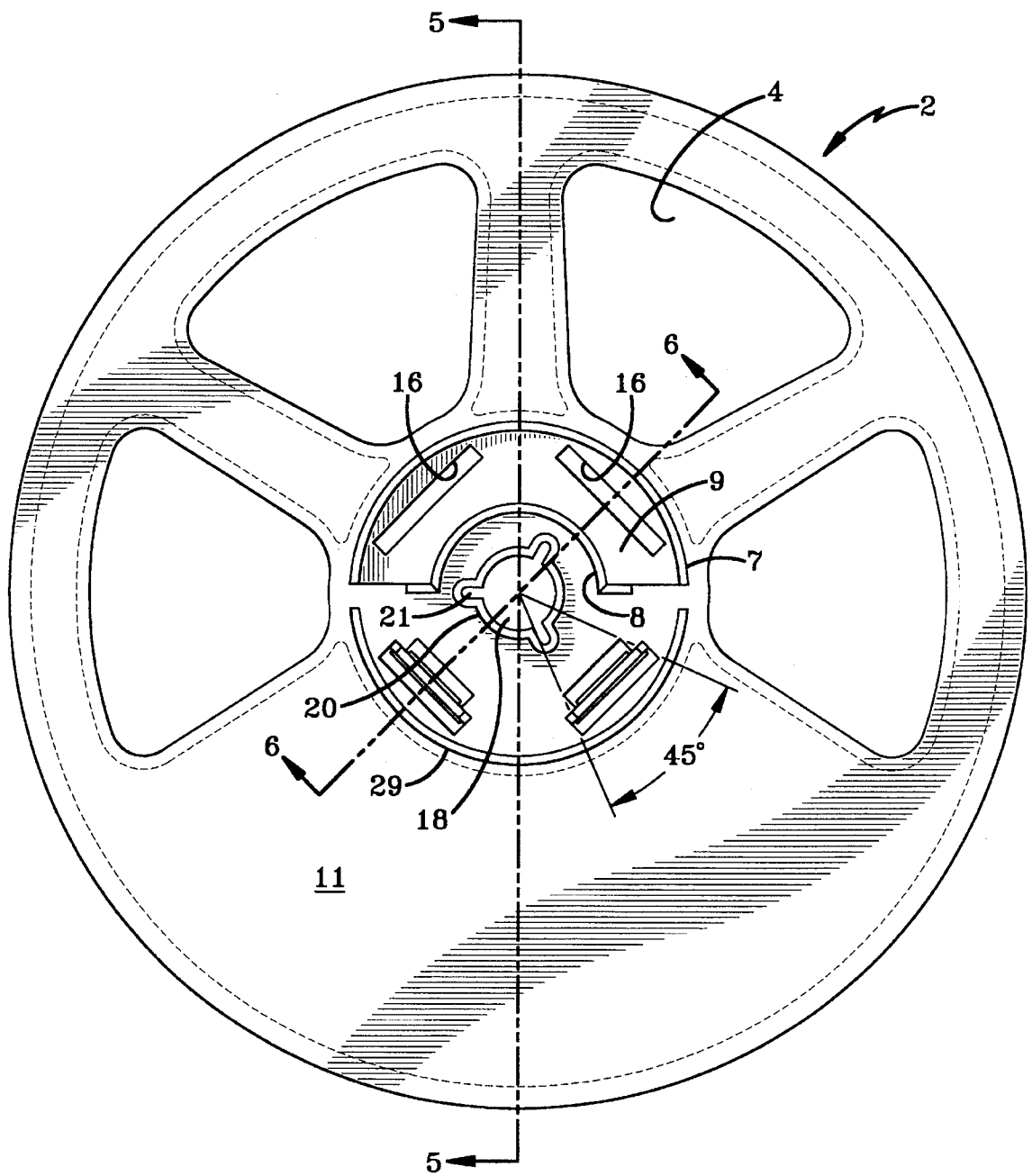
FIG. 4 is a top plan view of the tape reel member, as shown in FIG. 2.
Figure 5:
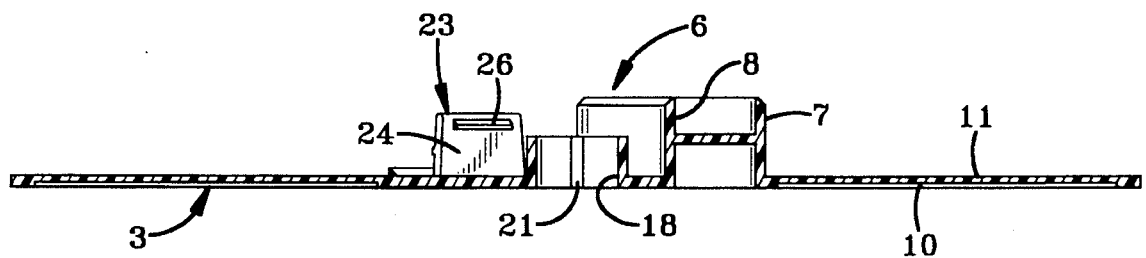
FIG. 5 is a sectional view taken along line 5—5, FIG. 4.

A pair of elongated latching slots 16 is formed in web wall 9 and are oriented 90° with respect to each other, as shown particularly in FIG. 4. A central hole 18 is formed in the center of reel member 2 and is defined by an upstanding wall 20. A plurality of outwardly extending slots 21 are formed in wall 20 for receiving the locking member of a shaft on which tape reel 1 may ultimately be mounted for dispensing of the tape therefrom.

Figure 2:
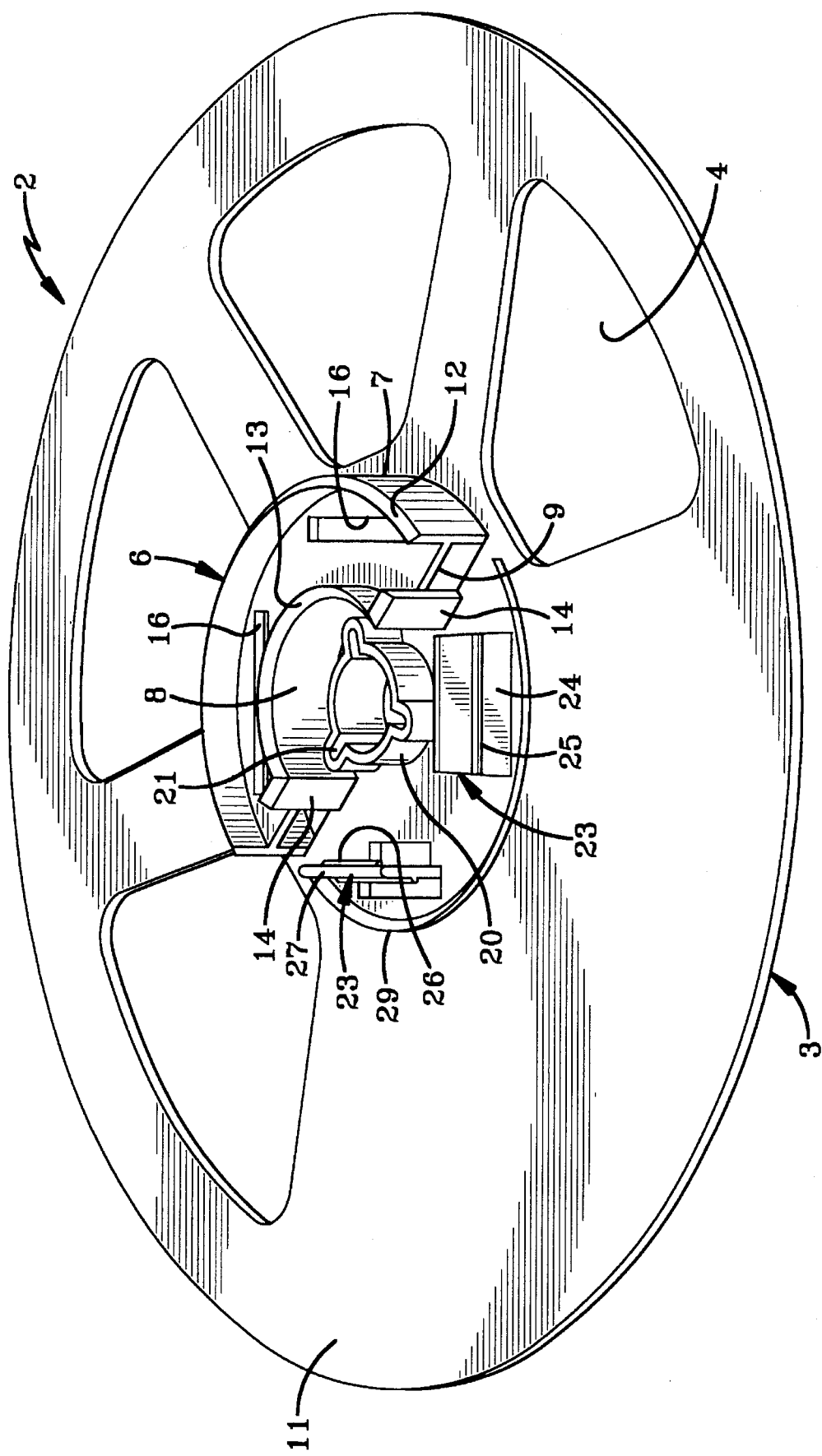
FIG. 2 is a perspective view of one of the reel members, two of which, when joined together, form the tape reel, as shown in FIG. 1.
Figure 3:
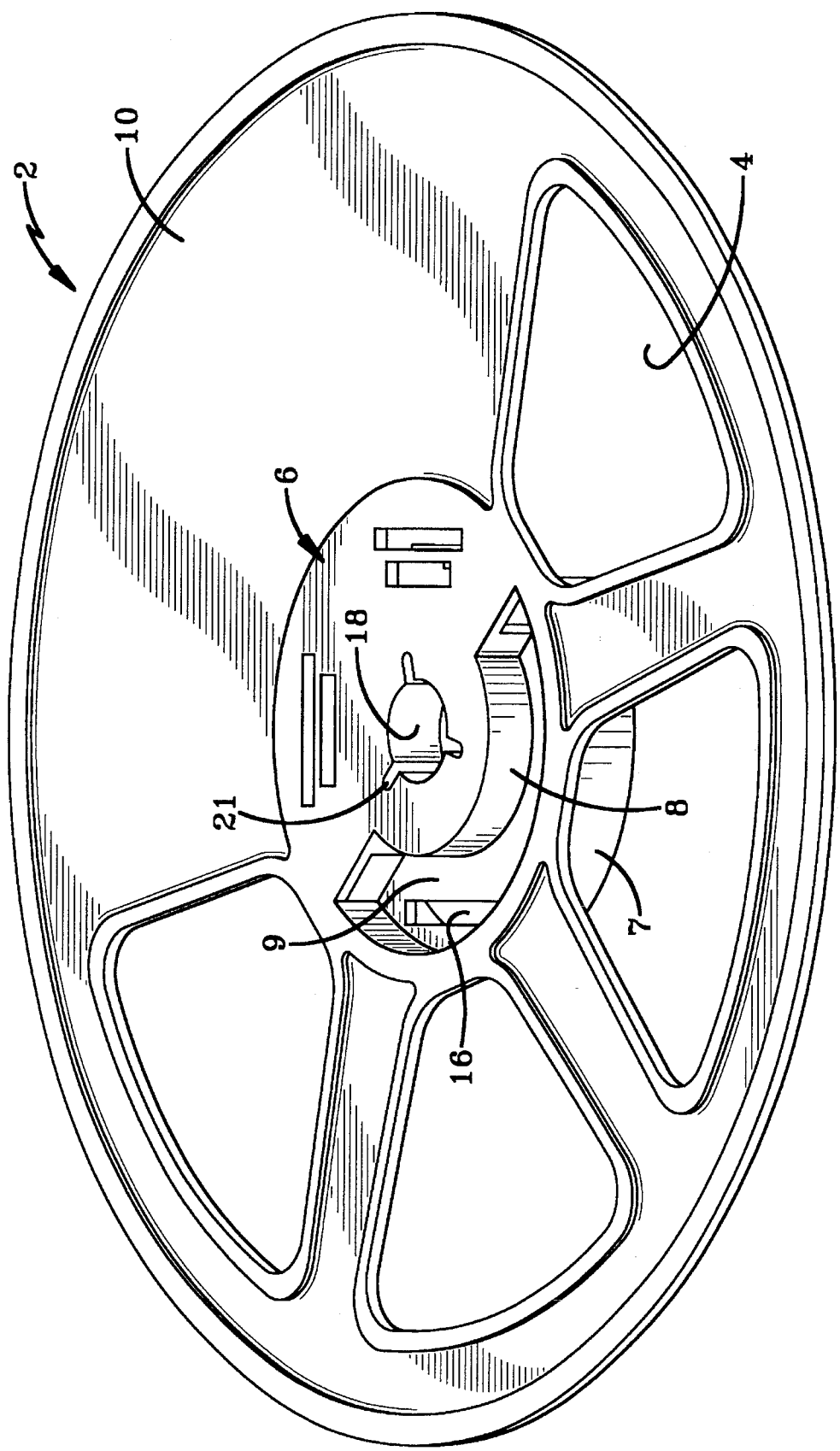
FIG. 3 is a perspective view of the opposite side of the tape reel member of FIG. 2.
Figure 6:
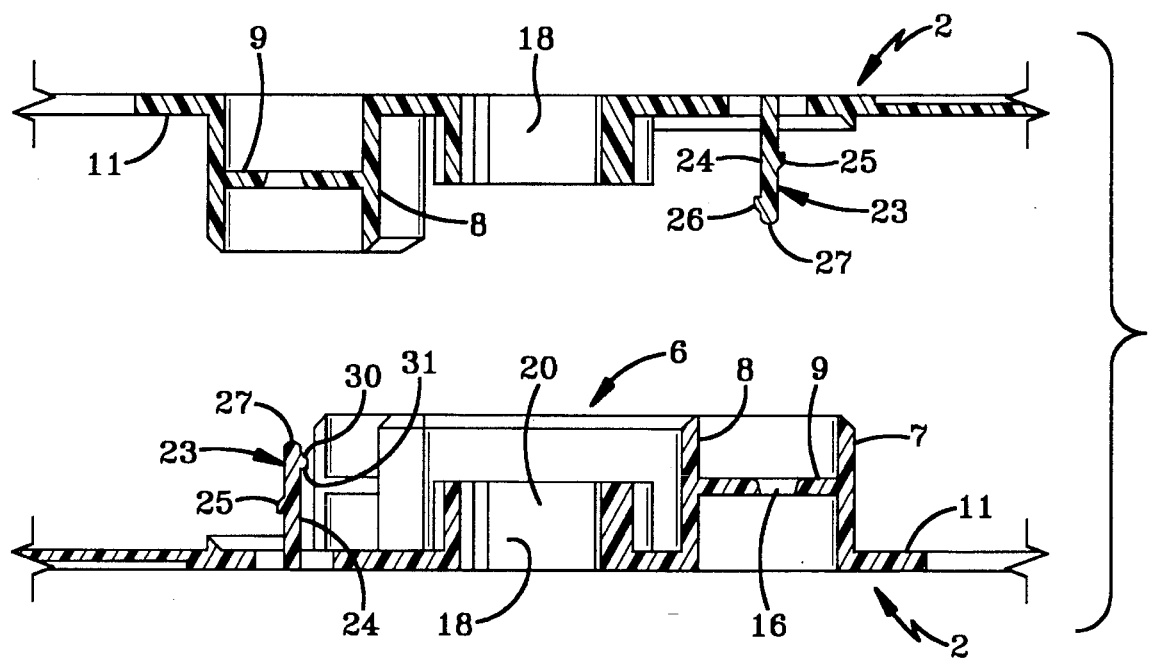
FIG. 6 is a fragmentary sectional exploded view of the hub sections of a pair of reel members prior to being joined, when viewed taken along line 6—6, FIG. 4.

As best shown in FIGS. 2, 4 and 6, a pair of upstanding latching projections, each of which is indicated generally at 23, extend upwardly from inner surface 11 of circular flange 3 and are oriented 90° with respect to each other, and are located diametrically opposite a latching slot 16. As best shown in FIG. 6, each latching projection 23 includes a flexible stem 24 having a pair of latching catches 25 and 26 extending outwardly from stem 24 in opposite directions from each other, with latching catch 26 being located adjacent a top edge 27 of stem 24, and with latching catch 25 being located generally at the midpoint of the stem. A small semicircular rib 29 (FIG. 2) preferably is formed on inner surface 11 and is circumferentially oriented with outer wall 7 of hub section 6.

Figure 7:
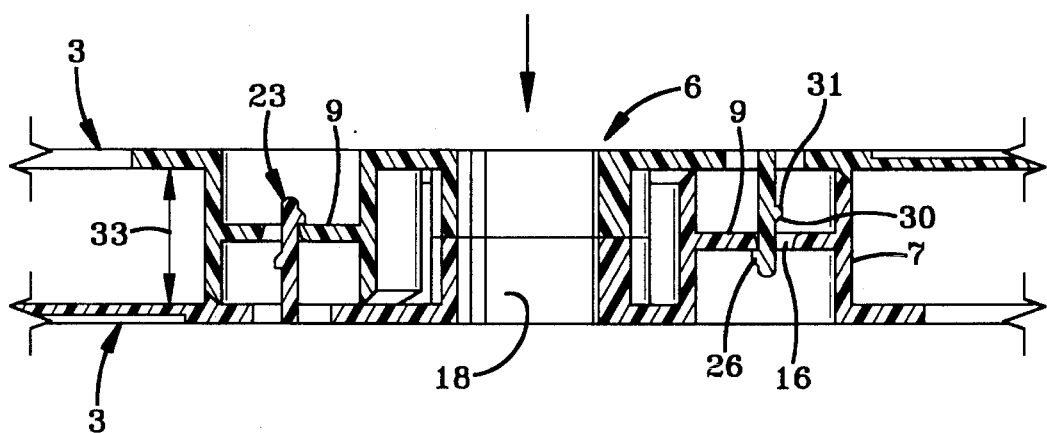
FIG. 7 is a fragmentary sectional view of the two hub sections of FIG. 6 when in a joined position, as shown in FIG. 1.

The two identical reel members 2 are snap fitted together, as shown in FIGS. 6 and 7, wherein each of the latching projections 23 extends through a respective latching slot 16 of an opposite reel member 2, and as shown in FIG. 7. The inwardly extending topmost latching catches 26 engage web wall 9 adjacent latching slots 16 to maintain the two circular flanges in a tight snap-fit joined relationship, as shown in FIG. 7. Each latching catch 26 includes a tapered surface 30 which terminates in a right-angled shoulder 31 (FIG. 6). This facilitates the insertion of the latching catches through their corresponding latching slot 16, and provides rigid coupling of the reel members in their joined position, as shown in FIG. 7.

When web wall 9 is formed intermediate the height of outer and inner hub walls 7 and 8, outermost latching catches 26 will engage web wall 9, as shown in FIG. 7, providing for a predetermined spacing 33 between circular flanges 3 of the joined reel members 2 for receiving a particular width of tape on the cylindrical hub formed therebetween by the two semicircular hub sections 6. It is readily understood that when the two reel members 2 are joined, the two hub sections 6 will align circumferentially with each other to form a substantially continuous cylindrical hub provided by the two hub section outer walls 7.

Figure 8:
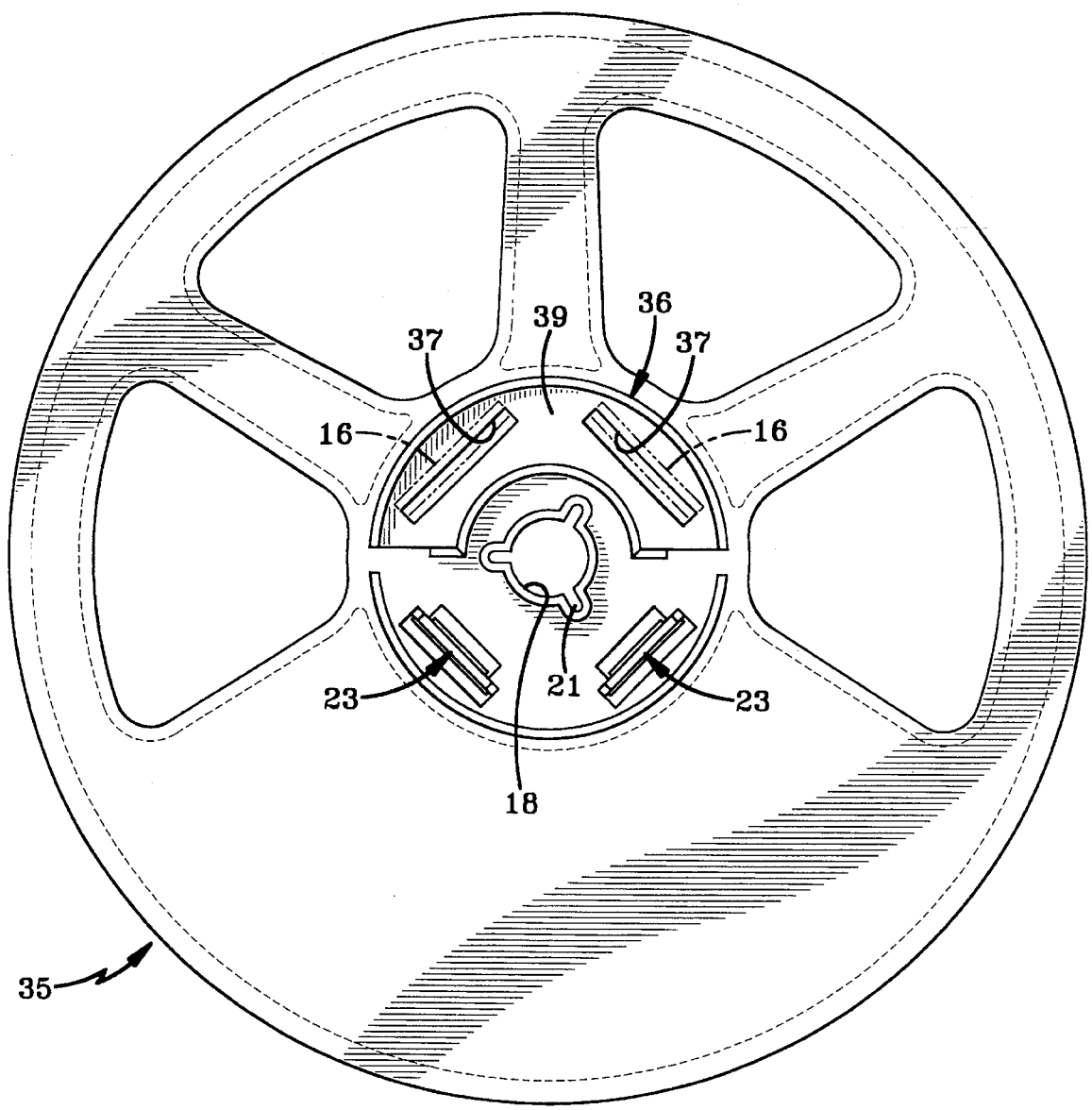
FIG. 8 is a plan view similar to FIG. 4, showing a slightly modified hub section of the reel member.
Figure 9:
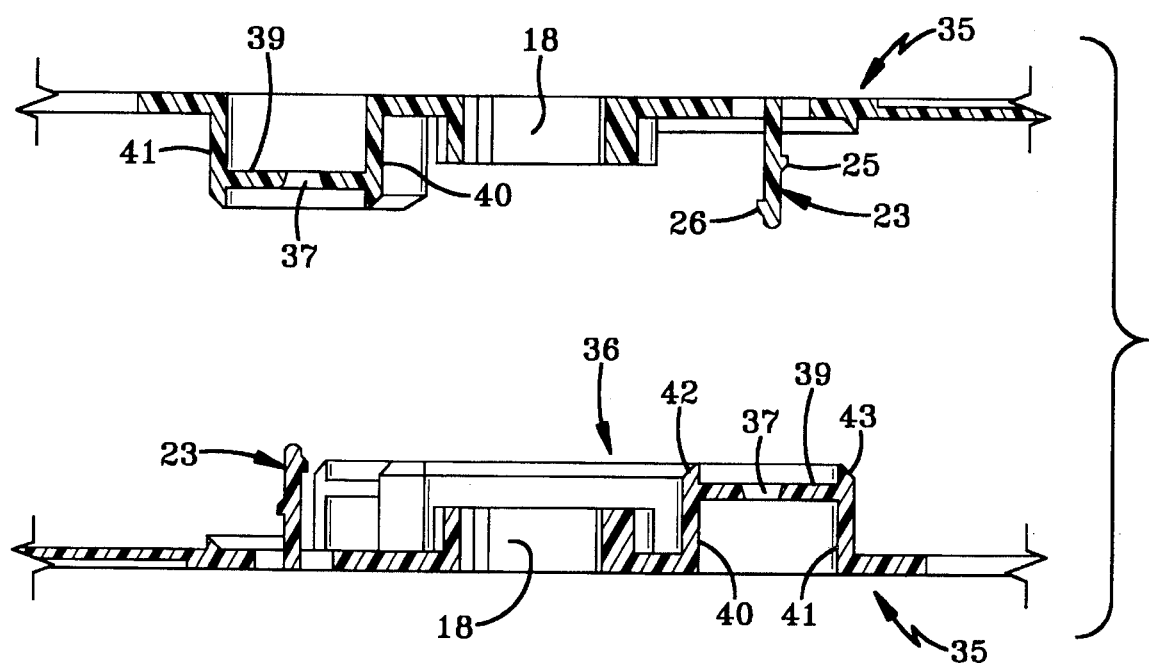
FIG. 9 is a fragmentary sectional exploded view similar to FIG. 6, showing the two hub sections of the embodiment of FIG. 8 prior to being joined.
Figure 10:
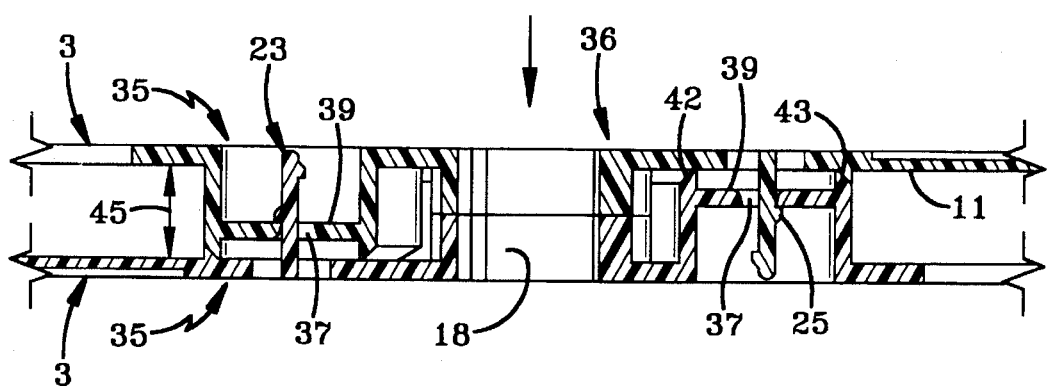
FIG. 10 is a fragmentary sectional view similar to FIG. 7, showing the hub sections of FIG. 9 when in a joined position, providing a smaller spacing between the flanges of the two reel members.

In accordance with another feature of the invention, the spacing 33 between the reel flanges can be varied relatively easily during the formation of each reel member 2 to provide a tape reel which will accommodate another size of tape. This modification is shown in FIGS. 8–10 and provides a reel member, indicated at 35, which is similar to reel member 2 with the exception that during the forming thereof, a slightly modified mold insert is used to form a modified hub section 36. In hub section 36, the pair of latching slots 37 are spaced radially inwardly from the location of latching slots 16, which are shown in dot-dash lines in FIG. 8, a distance so that when the two reel members 35 are joined, as shown in FIG. 10, inner latching catch 25 will extend through latching slots 37 and engage web wall 39 of hub section 36.

In this modification, the heights of inner and outer hub section walls 40 and 41, respectively, have been decreased by the use of a different mold insert, with web wall 39 being located generally adjacent top edges 42 and 43 of walls 40 and 41, respectively. When reel members 35 are joined together in a snap-fit relationship, as shown in FIG. 10, by the engagement of lower latching catches 25 with the section of web walls 39 adjacent latching slots 37, a spacing 45 will be created between the inner surfaces 11 of circular flanges 3, which will be smaller than spacing 33, as shown in FIG. 7. In the preferred embodiments, spacing 33 will be 12 mm, with spacing 45 being 8 mm, both of which are adapted to receive two different standard-size tapes therebetween. As shown in FIG. 4, each latching slot 16 and projection 23 subtends an angle of approximately 45°.

Accordingly, tape reel 1 is formed of two identical reel members 2 or 35, each of which is molded as an integral one-piece plastic member, wherein when the two members are snap fitted together, as shown in FIGS. 7 and 10, a tape reel 1 is formed having a generally continuous cylindrical inner hub for the winding of a tape thereon. Furthermore, a simple replacement of a mold insert enables various hub sections 6 and 36 to be formed, each of which has slightly different positioned latching slots, whereby in one embodiment, the top inwardly extending latching catches 26 form the latching function which is used with higher hub walls 7 and 8 to provide for a greater spacing between the flanges, and wherein the latching catches 25 of the same latching projections 23 are utilized to form a smaller separation or spacing between the flanges by use of the outwardly extending lower latching catches 25 which engage in slightly moved latching slots 37, wherein the hub walls 40 and 41 are of a smaller height, thereby providing for a reduced spacing between the flanges, as shown in FIG. 10. The same molding die is used for the entire reel member, with only that portion of the molding die being replaced which is used to form the particular hub section which has the very slight modifications as described above, namely, a slight movement of the latching slots 37 and a shorter height hub section inner and outer walls 40 and 41.

Therefore, it is readily seen that by a simple die modification with most of the remaining die components being usable, two different size reel members 2 and 35 can be produced in an efficient and inexpensive manner for subsequent forming of the tape reel by the snap-fit joinder of the two identical reel members.

Accordingly, the improved tape reel is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tape reel is constructed and used, the characteristics of the construction, and the advantageous, new and useful results obtained; the new and useful structures, devices, elements, arrangements, parts and combinations, are set forth in the appended claims.

I claim:

1. A reel for carrying a tape thereon, said reel including:

first and second members joinable to form said reel, each of said members comprising a circular flange having inner and outer faces, an arcuate hub section extending from the inner face, said hub section having outer and inner concentric peripheral walls and an intervening web wall, said web wall being formed with a pair of slots;

a pair of flexible latching projections extending from the inner face of each of said members and complementary sized to the web wall slots so as to be receivable therein, each of said projections being formed with first and second catches extending outwardly in opposite directions from each other, said latching projections of the first and second members extending into the slots of the second and first end members, respectively, with one of said catches of each of said latching projections of each of said members engaging the web wall of the other of said members to join said members together, with said hub sections circumferentially aligning with each other to form a substantially cylindrical hub spacing the circular flanges a predetermined distance apart for receiving a length of tape therebetween.

2. The reel defined in claim 1 in which each of the latching projections is located diametrically opposite one of the slots in each of the members.

3. The reel defined in claim 2 in which the latching projections extend at substantial right angles to each other; and in which the slots extend at substantial right angles to each other.

4. The reel defined in claim 1 in which the inner and outer peripheral walls of each of the hub sections are substantially semicircular.

5. The reel defined in claim 1 in which the web wall of each of the hub sections extends radially between and intermediate the inner and outer peripheral walls.

6. The reel defined in claim 5 in which each of the first latching catches extends from the latching projection inwardly towards one of the latching slots and is located adjacent a top edge of said latching projection; and in which each of said first catches extends through a respective latching slot and engages an edge of each of said slots to join the first and second members with the flanges having a predetermined spacing therebetween.

7. The reel defined in claim 1 in which the web wall of each of the hub sections extends radially between the inner and outer peripheral walls generally adjacent top edges of said peripheral walls.

8. The reel defined in claim 7 in which each of the second latching catches extends outwardly from its respective latching projection and through a respective latching slot and engages an edge of each of said slots to join the first and second members with the flanges having a predetermined spacing therebetween.

9. The reel defined in claim 1 in which each of latching slots and latching projections subtend an angle of approximately 45°.

10. The reel defined in claim 1 in which each of the members is formed with a center hole defined by an upstanding wall extending outwardly from the inner face of said member.

11. A tape reel for carrying a tape thereon comprising:

first and second members, each having an outer circular flange and an inner hub section; each hub section having an outer hub wall and a web wall extending radially therefrom and formed with at lest one latching slot therein; at least one flexible latching projection formed on each of the flanges and having a pair of latching catches formed on each of said latching projections, one of said latching catches of each of said members being engageable in the latching slot of the other of said members with said latching slot being substantially diametrical of the latching projection on each of said members to join said members together whereby the flanges have a first spacing therebetween, with said hub sections aligning with each other to form a hub between said flanges for receiving of a tape thereon, with the spacing between the flange being variable depending upon which of the latching catches is engaged in the latching slots.

12. The tape reel defined in claim 11 in which the first and second members are identical, each being a one-piece plastic member.

13. The tape reel defined in claim 11 in which the pair of latching catches includes inner and outer catches located on opposite sides of each of the latching projections.

14. The tape reel defined in claim 11 in which a pair of latching slots and a pair of latching projections are formed on each member, each of said projections being oriented at right angles to each other, and each of said slots being oriented at right angles to each other.

15. The tape reel defined in claim 14 in which each hub section includes an inner hub wall concentric with the outer hub wall with the web wall extending therebetween; and in which said hub walls are substantially semicircular.

16. The tape reel defined in claim 15 in which the inner latching catches are located adjacent top edges of the latching projections, and the outer latching catches are located intermediate said top edges and the outer flanges.

17. The tape reel defined in claim 16 in which the web wall extends between top edges of the inner and outer hub walls when the outer latching catches join the first and second members.

18. The tape reel defined in claim 16 in which the web wall extends between the inner and outer hub walls intermediate the top edges of said hub walls and the flanges when the inner latching catches join the first and second members.

19. The tape reel defined in claim 14 in which the latching slots and projections each subtend an angle of approximately 45°.

20. The tape reel defined in claim 11 in which each of the latching catches has a tapered wall and a latching shoulder extending at 90° to the latching projection.

21. A tape reel for carrying a tape thereon comprising:

first and second members, each having an outer circular flange and an inner hub section; each hub section having an outer hub wall and a web wall extending radially therefrom and formed with at least one latching slot therein; at least one flexible latching projection formed on the flange and having at least one latching catch thereon, each of the latching catches having a tapered wall and a latching shoulder extending at 90° to the latching projection; said latching catch of each of said members being engageable in the latching slot of the other of said members to join said members together whereby the flanges have a first spacing therebetween, with said hub sections aligning with each other to form a hub between said flanges for receiving of a tape thereon.

* * * * *